United States Patent Office 3,155,673
Patented Nov. 3, 1964

3,155,673
PROCESS FOR PREPARING VITAMIN B₆ AND
RELATED COMPOUNDS
Eizo Matsumura, 355 Kyokoji, Yao,
Osaka Prefecture, Japan
No Drawing. Filed Dec. 27, 1961, Ser. No. 162,588
Claims priority, application Japan, Jan. 12, 1961,
36/851, 36/852, 36/853, 36/854
10 Claims. (Cl. 260—295.5)

This invention relates to the production of 5-hydroxy-6-methylpyridine-3,4-dicarboxylic acid. In one particular aspect, this invention is concerned with a simple and economical process of preparing 5-hydroxy-6-methylpyridine-3,4-dicarboxylic acid from the lower alkyl or aryl ester of 3-cyano-6-methyl-2-pyridone-4-carboxylic acid. In another aspect, this invention is concerned with new and useful intermediate products, namely 6-methyl-2-pyridone-3,4-dicarboxylic acid and 5-hydroxy-6-methyl-2-pyridone-3,4-dicarboxylic acid, and with the methods for preparing such new intermediate products. In still another aspect, this invention is directed to the improved process of preparing vitamin B₆ (pyridoxine).

A typical process of embodying the present invention will be represented by the following scheme:

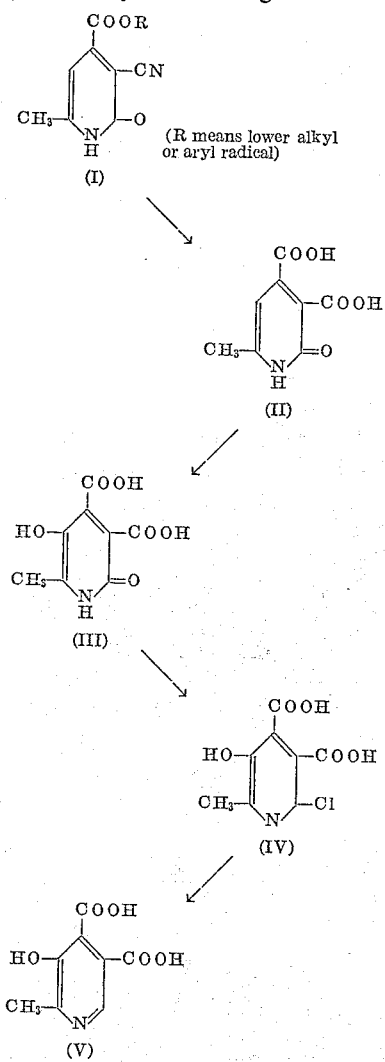

The present invention will be further described with reference to the sequence of steps represented in the above scheme.

The first step involved in the process of the present invention is the hydrolysis of the ester of 3-cyano-6-methyl-2-pyridone-4-carboxylic acid with an acidic or alkaline hydrolyzing agent. Also suitable as the starting compound for the process embodying the present invention are the lower alkyl ester of 3-cyano-6-methyl-2-pyridone-4-carboxylic acid, e.g. methyl 3-cyano-6-methyl-2-pyridone-4-carboxylate, ethyl 3-cyano-6-methyl-2-pyridone-4-carboxylate, propyl 3-cyano-6-methyl-2-pyridone-4-carboxylate, n-butyl 3-cyano-6-methyl-2-pyridone-4-carboxylate, etc. If necessary, it also is possible to use the aryl ester (e.g. phenyl 3-cyano-6-methyl-2-pyridone-4-carboxylate) as the starting compound. These starting compounds can be easily produced by the reaction of the corresponding lower alkyl or aryl acetonyloxalate with cyanoacetic amide according to the known method described in Chem. Ber. 49, 2489–90 (1958).

The hydrolyzing agent may be selected from inorganic acids, such as hydrochloric, nitric or phosphoric acid; organic acids, such as tartaric, oxalic or acetic acid; inorganic bases, e.g. the hydroxides, carbonates and bicarbonates of alkali metals or alkaline earth metals. These hydrolyzing agents usually are in the form of an aqueous solution, the concentration of which may vary within a wide range, but such concentration usually is from 3% to 10% in the case where an acid is employed or it is from 5% to 15% in the case where an alkali is employed. The temperature for the hydrolysis may be approximately from room temperatures to 130° C., but generally speaking, it should preferably be a temperature above the boiling point of the corresponding alcohol formed by the hydrolysis of the selected ester. For example, a suitable hydrolyzing temperature for methyl 3-cyano-6-methyl-2-pyridone-4-carboxylate is within the range of from 70° to 120° C. and that for ethyl 3-cyano-6-methyl-2-pyridone-4-carboxylate is within the range of from 80° to 130° C. The time for hydrolysis may be varied within the range of from 5 to 30 hours, depending upon the class and concentration of the hydrolyzing agent used.

The resulting reaction mixture, which is obtained through acidic hydrolysis, is allowed to stand in a cold place overnight, whereby colorless crystalline plates or prisms are separated or precipitated out. The separated crystalline mass is recovered by filtration, and the filtrate is concentrated under reduced pressure to yield another crop of 6-methyl-2-pyridone-3,4-dicarboxylic acid in crystalline plates or prisms. The desired 6-methyl-2-pyridone-3,4-dicarboxylic acid usually is recovered in the form of mono-hydrate which can be converted into free 6-methyl-2-pyridone-3,4-dicarboxylic acid by completely dehydrating it by means of Abderhalden's dryer.

In the paragraph immediately above, the procedures for recovery of the desired product are suitable where hydrolysis is effected by using an acid. If hydrolysis is effected by using an alkali or alkaline earth metal salt, the alkali metal or alkaline earth metal salt of 6-methyl-2-pyridone-3,4-dicarboxylic acid can not be separated from the reaction mixture obtained through the hydrolysis, even when the mixture is allowed to stand in an ice box for a considerably long period of time. Accordingly, if the desired product in free form is required, neutralization of the reaction mixture with an acid should be effected before subsequent treatment.

In the first step, the following chemical reaction takes place

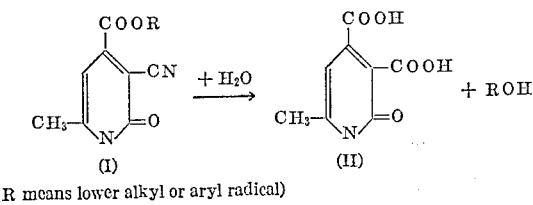

(R means lower alkyl or aryl radical)

In the second step which is involved in the process of the present invention, 6-methyl-2-pyridone-3,4-dicarboxylic acid or the monohydrate or alkali metal salt thereof is subjected to Elbs persulfate oxidation in an aqueous alkaline medium, thus producing 5-hydroxy-6-methyl-2-pyridone-3,4-dicarboxylic acid. Since the Elbs persulfate oxidation preferably is carried out in an aqueous alkaline medium, an aqueous solution of the compound should be adjusted to be weakly alkaline by the addition of an alkali in a suitable amount depending upon whether free 3-methyl-2-pyridone-3,4-dicarboxylic acid or the monohydrate or alkali metal salt thereof is used. Furthermore, as is apparent from the present specification, the liquid reaction mixture obtained through the hydrolysis of 3-cyano-6-methyl-2-pyridone-4-carboxylic acid with an alkaline agent, may be used directly (namely, without isolation of the formed 6-methyl-2-pyridone-3,4-dicarboxylic acid therefrom) after it is adjusted to a suitable pH if necessary.

With respect to the terminology in the description of the second step, it is to be understood that the term "Elbs persulfate oxidation" means the overall stage wherein 6-methyl-2-pyridone-3,4-dicarboxylic acid is reacted with persulfate in an aqueous alkaline medium and the resulting reaction mixture is subsequently treated with an acid thereby to obtain 5-hydroxy-6-methyl-2-pyridone-3,4-dicarboxylic acid, while the term "oxidation" means the stage wherein 6-methyl-2-pyridine-3,4-dicarboxylic acid is reacted with persulfate, thereby introducing a sulfonic ester group into the 5-position of the 6-methyl-2-pyridone-3,4-dicarboxylic acid.

The reaction medium for oxidation may be an aqueous alkaline solution. For example, an aqueous solution containing 1–10% by weight of the hydroxide, carbonate or bicarbonate of alkali metal or alkaline earth metal is preferred.

The oxidation temperature may be within the range of from −5° to 30° C., and preferably from 0° to 10° C. The oxidation period usually is from two to seven days, but it may be shortened by employing stirring or other proper means for promoting the oxidation.

In accordance with the present invention, it is preferable to carry out the desired oxidation in the presence of a catalyst. Although the use of a catalyst is not always necessary, it is advantageous in that it results in an improved yield and a shortened reaction period for oxidation. Suitable catalysts are ferrous sulfate, ferrous chloride, ferrous oxalate, manganese sulfate, etc. Suitable reaction agents which may be used for the oxidation are sodium persulfate, potassium persulfate, ammonium persulfate and mixtures of these, and such agent should be used in an amount equal to, or slightly in excess of the amount of 6-methyl-2-pyridone-3,4-dicarboxylic acid or the monohydrate or alkali metal salt thereof used.

5-hydroxy-6-methyl-2-pyridone-3,4-dicarboxylic acid so produced is a new compound which has never been known in the art, and one novel feature of the second step resides in the selective oxidation of 2-pyridone nucleus at its 5-position. Such selective oxidation makes it possible to provide a short cut for the synthesis of vitamin $B_6$ from the lower alkyl or aryl ester of 3-cyano-6-methyl-2-pyridone-4-carboxylic acid.

After completion of the oxidation reaction, the resulting reaction mixture, as it is or after it has been filtered to remove solids, is adjusted to a pH of about 1.2 with an acid and then evaporated to dryness under reduced pressure. The residue obtained is extracted with an organic solvent, e.g. acetone, ethanol, methanol, etc., whereby a crystalline product containing a small amount of oily material is obtained. This product can be recrystallized from acetone and water to give crystalline pure 5-hydroxy-6-methyl-2-pyridone-3,4-dicarboxylic acid.

The chemical reaction which takes place in the second step of the process embodying the invention can be represented by the following formula:

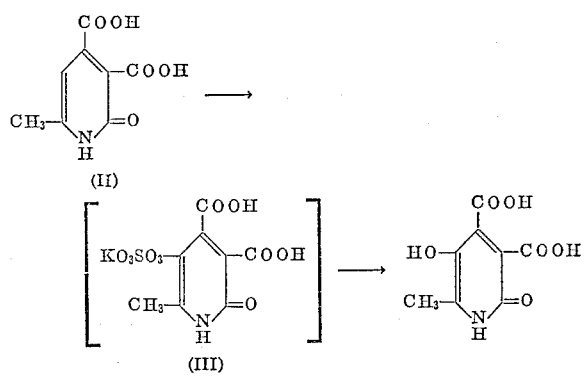

In the third step of the process embodying the invention, 5-hydroxy-6-methyl-2-pyridone-3,4-dicarboxylic acid is chlorinated thereby producing 2-chloro-5-hydroxy-6-methyl-pyridine-3,4-dicarboxylic acid.

5-hydroxy-6-methyl-2-pyridone-3,4-dicarboxylic acid or the monohydrate, either of which is the resultant of the second step, is reacted with an anionic chlorine-liberating agent. A suitable chlorinating agent is phosphorus oxychloride alone, or in combination with phosphorus pentachloride. In one preferred embodiment, 5-hydroxy-6-methyl-2-pyridone-3,4-dicarboxylic acid or the monohydrate thereof is suspended in phosphorus oxychloride, and then phosphorus pentachloride is added to the formed suspension, whereupon reaction takes place with evolution of hydrogen chloride gas. The reaction mixture which is acidic due to phosphoric acid formed is treated with alkali metal carbonate, whereby decomposition of the remaining chlorinating agent and neutralization of the phosphoric acid are effected, while the resulting intermediate is rapidly hydrolyzed. The mixture thus treated is extracted with a solvent, e.g. ether, benzene, chloroform, etc., thus recovering the desired 2-chloro-5-hydroxy-6-methylpyridine-3,4-dicarboxylic acid or the monohydrate thereof.

The chlorination reaction referred to herein can be carried out by using about 1 to 2.5 moles of a chlorinating agent per one mole of the starting compound used. The chlorinating temperature may be within the approximate range of from 70° to 120° C. and the chlorination period may be in the range from 30 minutes to 4 hours.

The reaction which takes place herein can be represented by the following chemical formula:

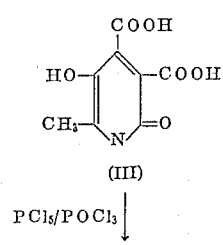

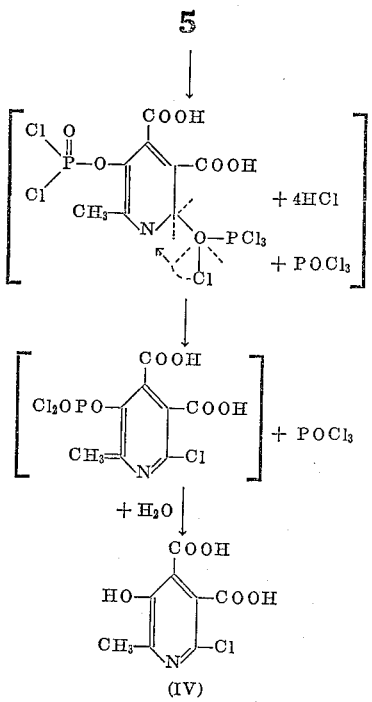

In the fourth step of the process embodying the invention, 2-chloro-5-hydroxy-6-methylpyridine-3,4-dicarboxylic acid or the monohydrate thereof is subjected to catalytic reduction thereby to produce 5-hydroxy-6-methyl-pyridine-3,4-dicarboxylic acid.

In accordance with the present invention, 2-chloro-5-hydroxy-6-methyl-pyridine-3,4-dicarboxylic acid or the monohydrate thereof is dissolved in an aqueous alkaline solution (which contains sodium hydroxide or potassium hydroxide in an amount necessary for neutralization of the hydrochloric acid formed through reduction) and the resulting solution is subjected to catalytic reduction in an autoclave.

In the practice of the present invention, the catalytic reduction should preferably be carried out under an elevated pressure, e.g. hydrogen pressure of from 40 to 65 atm. and particularly of from 20 to 30 atm. The reaction temperature may be within the range of about 20° to 80° C. and the reaction period may be from about 2 to 5 hours. In carrying out the instant reaction, a commonly known hydrogenation catalyst, e.g. Raney nickel or platinum catalyst, is advantageously used.

After completion of the catalytic reduction, the catalyst is separated from the reaction mixture by filtration, and the filtrate obtained is acidified with an acid and then evaporated to dryness under reduced pressure, thereby resulting in 5-hydroxy-6-methylpyridine-3,4-dicarboxylic acid.

The reduction reaction which takes place in this step can be represented by the following chemical formula:

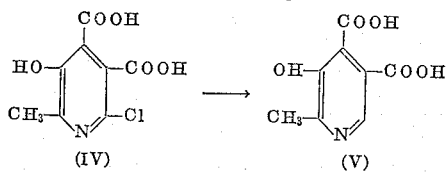

5 - hydroxy - 6 - methylpridine - 3,4 - dicarboxylic acid, which is obtained in the process embodying the present invention, can be easily converted into vitamin $B_6$ (pyridoxine) by using a sodium borohydride-aluminum chloride reduction system (cf. Journal of the American Chemical Society 80, 6244–9 (1958)). If viatmin $B_6$ synthesis starting from the lower alkyl or aryl ester of 3-cyano-6-methyl-2-pyridone-4-carboxylic acid is made through the new route delineated herein, it is possible to obtain desired vitamin $B_6$ in highly improved yield and by extremely simplified procedures.

Example 1

Into a one-liter Erlenmeyer flask equipped with a cooler there are introduced 20 g. of ethyl 3-cyana-6-methyl-2-pyridone-4-carboxylate and 500 ml. of 3% aqueous hydrochloric acid solution. The mixture is boiled on an oil bath at 115°–120° C. for 20 hours, during which time ethyl 3-cyano-6-methyl-2-pyridone-4-carboxylate is gradually dissolved therein. The resulting solution is initially yellow in color and then turns to straw color (pale yellow color). The reaction mixture is allowed to stand in an ice box overnight. At that time crystalline colorless plates appear. The crystallized mass is filtered to recover 15.9 g. of crude crystalline product as the first crop. The filtrate is vaporized to dryness under reduced pressure and the remaining mass is treated with 100 ml. of water, 1.8 g. of undissolved crystalline product is recovered as the second crop. The total amount (16.7 g.) of crude crystalline product is boiled with 90 ml. of water, and then filtered to remove a trace amount of hot water-insoluble crystalline material therefrom. The filtrate is cooled at 0°–5° C., whereby 16.5 g. of crystalline product decomposing at 230°–232° C. is separated out. Yield 78.9%. By further recrystallization of this product from water, pure crystalline 6-methyl-2-pyridone-3,4-dicarboxylic acid monohydrate decomposing at 240° C. is obtained.

For $C_8H_7O_5N \cdot H_2O$—Calcd.: N, 6.51%; $H_2O$, 8.37%. Found: N, 6.58%; $H_2O$, 8.24%.

Example 2

To 1.0 g. (0.0049 mole) of methyl 3-cyano-6-methyl-2-pyridone-4-carboxylate, 10 ml. of aqueous 10% sodium hydroxide solution are added. The resultant mixture is heated with refluxing on an oil bath at 120° C. for 5 hours. After cooling the reaction mixture, it is adjusted to pH 0 with 6 N, HCl. The solution, without separation of crystalline solids therefrom, is allowed to cool until crystalline white plates appear. 0.8 g. of desired 6-methyl-2-pyridone-3,4-dicarboxylic acid melting at 232°–233° C. (decomp.) are obtained. Yield 73%.

Example 3

In this example, 1.7 g. of methyl 3-cyano-6-methyl-2-pyridone-4-carboxylate is hydrolyzed with 40 ml. of an aqueous solution containing 5% sulfuric, nitric, phosphoric, tartaric or formic acid. Hydrolysis is effected at 120° C. (on an oil bath) for 10 hours and 20 hours, with refluxing. Upon cooling the mixture, a crystalline mass appears. By filtration, crystalline 6-methyl-2-pyridone-3,4-dicarboxylic acid decomposing at 233.5°–234.0° C. is obtained. The results are set forth in the following table.

| Hydrolyzing agent | Heating for 10 hours | | Heating for 20 hours | |
|---|---|---|---|---|
| | Amount, g. | Yield, percent | Amount, g. | Yield, percent |
| 5% $H_2SO_4$ | | | 0.65 | 95.0 |
| 5% $HNO_3$ | 0.6 | 68.8 | 0.6 | 68.8 |
| 5% $H_3PO_4$ | | | 0.7 | 80.6 |
| 5% tartaric acid | | | | |
| 5% HCOOH | | | | |

These data indicate that where 5% tartaric acid or 5% formic acid is used as hydrolyzing agent, the resulting mixture still contains a major amount of unreacted methyl 3-cyano-6-methyl-2-pyridone-4-carboxylate after heating for 20 hours. Therefore, in order to effect successful hydrolysis with tartaric or formic acid, higher concentrations of these acids or longer heating periods should be employed.

Example 4

In this example, 1.7 g. of methyl 3-cyano-6-methyl-2-pyridone-4-carboxylate is hydrolyzed with 40 ml. of an aqueous solution or 5% (or 10%) sodium carbonate or 5% (or 10%) sodium bicarbonate. The hydrolysis is effected on an oil bath (at the bath temperature of 120° C.) with refluxing. After the specified time, the reaction mixture has added thereto 1 N HCl to adjust its pH to 0.4. The solution is boiled for 10 minutes to dissolve solids therein. The resultant clear solution is cooled to yield a crystalline product. The yields of crystalline 6-methyl-2-pyridone-3,4-dicarboxylic acid decomposing at 233.5°–234° C. obtained are set forth in the following table.

| Hydrolyzing agent | Heating for 10 hours | | Heating for 20 hours | |
|---|---|---|---|---|
| | Amount, g. | Yield, percent | Amount, g. | Yield, percent |
| 5% Ba(OH)₂ | | | | |
| 5% Na₂CO₃ | 0.5 | 57.6 | 0.55 | 63.2 |
| 10% Na₂CO₃ | 0.4 | 46.4 | 0.6 | 68.8 |
| 5% NaHCO₃ | | | | |
| 10% NaHCO₃ | | | | |

The above data indicate that, where 5% $Ba(OH)_2$, or 5% or 10% $NaHCO_3$ is used as hydrolyzing agent, the resulting reaction mixture still contains a major amount of unreacted methyl 3-cyano-6-methyl-2-pyridone-4-carboxylate after heating for 20 hours, and therefore in order to effect successful hydrolysis with these agents, higher concentrations of these hydrolyzing agents or longer heating periods should be employed.

Example 5

One gram (0.0049 mole) of ethyl 3-cyano-6-methyl-2-pyridone-4-carboxylate is added to 10 ml. of 10% caustic soda solution. The mixture is refluxed on an oil bath with the bath temperature of 120° C. for 5 hours. After cooling this mixture, it is diluted with 10 ml. of water, and 0.0025 g. of ferrous sulfate dissolved in 1 ml. of water and then 1.6 g. (0.0059 mole) of potassium persulfate is added to the resulting dilution while it is cooled with ice-water. After shaking the resulting mixture for a short while, it is allowed to stand in an ice box at 5° C. for 6 days. The mixture is then filtered. The filtrate is heated at 90° C. for 4 hours, and after cooling, adjusted to pH 0.4 with 2 N HCl. It is boiled for 10 minutes, and after cooling, it is readjusted to pH 1.2 with sodium carbonate and vaporized to dryness under reduced pressure. The residue is extracted with acetone, and the acetone layer is distilled to remove the acetone therefrom, whereby the remaining mass gradually crystallizes out. The crystallized mass which contains a little amount of oily material is recovered on a suction filter and washed with a small amount of acetone. 0.6 g. of crude crystalline 5-hydroxy-6-methyl-2-pyridone-3,4-dicarboxylic acid decomposing at 206°–208° C. are obtained. Yield 54%.

Example 6

One gram (0.0049 mole) of methyl 3-cyano-6-methyl-2-pyridone-4-carboxylate is added to 10 ml. of an aqueous 10% caustic soda solution. The mixture is refluxed on an oil bath at a temperature of 120° C. for 5 hours. After cooling this mixture, it is diluted with 10 ml. of water, and 0.025 g. of ferrous sulfate dissolved in 1 ml. of water and then 1.6 g. (0.0059 mole) of potassium persulfate are added to the resulting dilution while it is cooled with ice water. After shaking the resulting mixture for a short while, it is allowed to stand in an ice box at 5° C. for 6 days. The mixture is then filtered. The filtrate is heated at 90° C. for 4 hours, and after cooling, adjusted to pH 0.4 with 2 N HCl. It is boiled for 10 minutes, and after cooling, it is readjusted to pH 1.2 with sodium carbonate and vaporized to dryness under reduced pressure. The residue is extracted with acetone, and the acetone layer is distilled to remove the acetone therefrom, whereby the remaining mass gradually crystallizes out. The crystallized mass which contains a little amount of oily material is recovered on a suction filter and washed with a small amount of acetone. 0.6 g. of crude crystalline 5-hydroxy-6-methyl-2-pyridone-3,4-dicarboxylic acid decomposing at 206°–208° C. are obtained. Yield 67%.

Example 7

Into an Erlenmeyer flask (500 ml.), there are introduced 10 g. of 6-methyl-2-pyridone-3,4-dicarboxylic acid monohydrate and then 200 ml. of an aqueous 5% sodium hydroxide solution. The resulting solution is cooled to 5° C. and then a solution of 0.25 g. of ferrous sulfate in 5 ml. of water, together with 15.8 g. of potassium persulfate, are added thereto. The mixture is shaken at 5° C. for one hour. The resulting liquid mixture is allowed to stand in a cold place at 5° C. for 6 days. It is filtered off. The filtrate is heated at 90° C. for 4 hours. After cooling this filtrate, it has added thereto about 16 ml. of conc. HCl to adjust it to pH 1.2. The liquid is vaporized to dryness under reduced pressure. The residue obtained is extracted with acetone, and the solvent is distilled off from the acetone extract, whereby a crystalline mass containing a small amount of oily material is obtained. By suction filtration, the oily material is removed, and the remaining crystalline mass is washed with a small amount of cold acetone. 9.0 g. of crude crystalline product decomposing at 222 to 224° C. is obtained.

By recrystallization, the desired pure 5-hydroxy-6-methyl-2-pyridone-3,4-dicarboxylic acid monohydrate is obtained, which decomposes at 227°–228° C. Yield 84%.

For $C_8H_7O_6N \cdot H_2O$—Calcd.: C, 41.57%; H, 3.92%. Found: C, 41.67%; H, 3.9%.

Example 8

One gram (0.0047 mole) of 6-methyl-2-pyridone-3,4-dicarboxylic acid is dissolved in 20 ml. of 5% aqueous caustic soda solution. While cooling the resulting solution, 0.05 g. of manganese sulfate dissolved in 2 ml. of water and then 1.6 g. (0.0059 mole) of potassium persulfate are added thereto. After shaking the mixture for a short while, it is kept in an ice box at 5° C. for 7 days. The resulted reaction mixture is filtered, and the filtrate obtained is heated at 90° C. for 4 hours. After cooling, it is adjusted to pH 1.2 with hydrochloric acid and then evaporated to dryness under reduced pressure. The residue is extracted with acetone, and the acetone is removed from the acetone extract by distillation, during which solids gradually separate out. The crystallized mass which contains a little amount of oily material is recovered by suction filtration and then washed with a small amount of acetone. Crude crystalline 5-hydroxy-6-methyl-2-pyridone-3,4-dicarboxylic acid, melting at 227°–228° C. (decomp), is obtained.

The same procedures as employed in the above run are repeated, with the exception that the manganese sulfate is replaced by an equal amount (0.05 g.) of ferrous chloride or ferrous oxalate.

The results obtained are summarized in the following table.

| Catalyst | Desired product, g. | Yield, percent |
|---|---|---|
| MnSO₄ | 0.9 | 83 |
| FeCl₂ | 0.8 | 75 |
| Fe(COOH)₂ | 0.9 | 83 |

Example 9

Into an Erlenmeyer flask (200 ml.), equipped with a cooler having a calcium chloride tube, there are introduced 5 g. of 5-hydroxy-6-methyl-2-pyridone-3,4-dicarboxylic acid monohydrate and 75 ml. of phosphorus oxychloride. To the resulting suspension, 11.3 g. of phosphorus pentachloride are added. The mixture is heated gradually on an oil bath, whereupon reaction takes place with evolution of hydrochloric acid gas. The bath temperature is raised up to 90° C. over a period of one hour, and heating is continued at this temperature for 4 hours. After completion of the reaction, the phosphorus oxychloride is distilled off under reduced pressure. To the viscous material obtained as residue, 500 g. of chopped ice are added thereby to have an aqueous solution, which is then adjusted to pH 0.4 by addition of about 8 g. of sodium carbonate. The solution is boiled for one hour, and after cooling, extracted with ether. The ether extract is dried over anhydrous sodium sulfate and then the solvent is removed therefrom by distillation. 4.2 g. of crude crystalline product decomposing at 207°–208° C. are obtained. The product develops red-purple color in the presence of an aqueous ferric chloride solution, and it is positive to Beilstein reaction to ascertain the presence of hydroxyl group and chlorine. By recrystallization from water, pure crystalline 2-chloro-5-hydroxy-6-methyl-pyridine-3,4-dicarboxylic acid monohydrate is obtained, which decomposes at 217°–217.5° C. Yield 77%.

For $C_8H_6O_5NCl \cdot H_2O$—Calcd.: N, 5.61%; Cl, 14.20%. Found: N, 5.67%; Cl, 14.53%.

*Example 10*

5-hydroxy-6-methyl-2-pyridone-3,4-dicarboxylic acid monohydrate, 0.50 g. (0.0022 mole), is mixed with 5 ml. of phosphorus oxychloride. The mixture is gradually heated on an oil bath. Reaction is effected with refluxing at 105° C. for 8 hours. After cooling the reaction mixture, phosphorus oxychloride is removed therefrom by distillation under reduced pressure. To the remaining syrup material, 5.0 g. of ice are added to have the residual amount of phosphorus oxychloride decomposed. The resulting aqueous solution in which the phosphorus oxychloride has been decomposed is adjusted to pH 0.4 by addition of sodium carbonate and then it is boiled for one hour. After cooling, the reaction mixture is extracted with ether. The ethereal extract is dried with anhydrous sodium sulfate and then freed from ether by distillation. 0.45 g. of crude crystalline product decomposing at 207°–208° C. are obtained. Yield 83%.

*Example 11*

5-hydroxy-6-methyl-2-pyridone-3,4-dicarboxylic acid monohydrate, 1.0 g. (0.0044 mole), is mixed with 5 ml. of phosphorus oxychloride and 1.2 g. (0.0058 mole) of phosphorus pentachloride. The mixture is gradually heated on an oil bath. Reaction proceeds while gas is vigorously evolved from the reaction mixture. Over a period of one hour, the bath temperature is raised up to 90° C. Heating is continued at this temperature for another four hours. After cooling the mixture, the phosphorus oxychloride is removed therefrom under reduced pressure. The remaining syrup material has added thereto 10.0 g. of chopped ice to decompose unreacted phosphorus pentachloride. The aqueous solution is adjusted to pH 0.4 by addition of sodium carbonate and then boiled for one hour. After cooling the reaction mixture, it is extracted with ether. The ethereal layer formed is dried over sodium sulfate and then the ether is removed therefrom by distillation. 0.8 g. of crude crystalline product decomposing at 207°–208° C. are obtained. Yield 74%.

*Example 12*

One gram (0.0044 mole) of 5-hydroxy-6-methyl-2-pyridone-3,4-dicarboxylic acid monohydrate is mixed with 5 ml. of phosphorus oxychloride and 1.2 g. (0.0058 mole) of phosphorus pentachloride. The resulting mixture is slowly heated on an oil bath. Reaction proceeds with appreciable evolution of hydrochloric acid gas. The bath temperature is raised up to 90° C. over a period of about one hour. At this temperature, heating is continued for another four hours. After cooling the reaction mixture, it is distilled under reduced pressure to remove phosphorus oxychloride therefrom. To the remaining viscous material, 10.0 g. of chopped ice are added to cause decomposition of the unreacted phosphorus pentachloride. To the resulting aqueous solution, sodium carbonate is added to adjust the solution to pH 0.4. Then, the solution is boiled for one hour, and after cooling, extracted with ether. The ethereal layer is dried over sodium sulfate, and then the ether is removed therefrom by distillation. 0.8 g. of crude crystalline 2-chloro-5-hydroxy-6-methylpyridine-3,4-dicarboxylic acid, decomposing at 207°–208° C., are obtained. Yield 74%.

*Example 13*

Into an autoclave (100 ml.), there are charged 2 g. of 2-chloro-5-hydroxy-6-methylpyridine-3,4-dicarboxylic acid monohydrate dissolved in 25 ml. of aqueous 3% sodium hydroxide solution, and then about 0.3 g. of Raney nickel catalyst is added. Hydrogen is passed into the mixture at 180° C. under 60 atm. Reduction is effected, with stirring, at 55°–60° C. for 3 hours. After completion of the reaction, the catalyst is separated from the reaction mixture by filtration. The filtrate is adjusted to pH 1.2 and evaporated to dryness under reduced pressure. To the residue obtained, 10 ml. of cold water is added and then the mixture is allowed to stand. After filtration, 1.7 g. of crude crystalline product decomposing at 254°–256° C. is obtained as undissolved material. This product is dissolved in 8 ml. of aqueous 6% sodium hydroxide solution and then treated with 8 ml. of aqueous 6% hydrochloric acid solution. The separate crystalline mass is recovered by filtration and then washed with water, ethanol and ether. Pure crystalline 5-hydroxy-6-methylpyridine-3,4 dicarboxylic acid is obtained. Yield 81%.

For $C_8H_6O_5N$—Calcd.: N, 7.22%. Found: N, 7.11%.

What I claim is:

1. A process of producing 5-hydroxy-6-methylpyridine-3,4-dicarboxylic acid, which comprises hydrolyzing one member selected from the group consisting of the lower alkyl and aryl esters of 3-cyano-6-methyl-2-pyridone-4-carboxylic acid to 6-methyl-2-pyridone-3,4-dicarboxylic acid, subjecting the resulting 6-methyl-2-pyridine-3,4-dicarboxylic acid to Elbs persulfate oxidation using, at least one member selected from the group consisting of potassium persulfate, sodium persulfate and ammonium persulfate in an aqueous alkaline medium, chlorinating the resulting 5-hydroxy-6-methylpyridone-3-4,dicarboxylic acid with an anionic chlorine-liberating agent selected from the group consisting of phosphorus oxychloride, phosphorus pentachloride and the mixture of both, and then reducing the resulting 2-chloro-5-hydroxy-6-methylpyridine-3,4-dicarboxylic acid with hydrogen in the presence of a hydrogenation catalyst.

2. A process producing 3,4-dihydroxyethyl-5-hydroxy-6-methylpyridine (vitamin B$_6$) which comprises hydrolyzing the ester of 3-cyano-6-methyl-2-pyridone-4-carboxylic acid to 6-methyl-2-pyridone-3,4-dicarboxylic acid, oxidizing the resulting 6-methyl-2-pyridone-3,4-dicarboxylic acid with at least one member selected from the group consisting of potassium persulfate, sodium persulfate and ammonium persulfate in an aqueous alkaline medium, chlorinating the resulting 5-hydroxy-6-methyl-2-pyridone-3,4-dicarboxylic acid with an anionic chloride-liberating agent selected from the group consisting of phosphorus oxychloride, phosphorus pentachloride and the mixture of both, reducing the resulting 2-chloro-5-hydroxy-6-methylpyridine-3,4-dicarboxylic acid with hydrogen in the presence of a hydrogen catalyst, and then reducing the resulting 5-hydroxy-6-methylpyridine-3,4-dicarboxylic acid with a sodium borohydride-aluminum chloride reduction system.

3. A process of preparing 6-methyl-2-pyridone-3,4-dicarboxylic acid which comprises hydrolyzing one member selected from the group consisting of the alkyl and aryl esters of 3-cyano-6-methyl-2-pyridone-4-carboxylic acid with a hydrolyzing agent, thereby to form 6-methyl-2-pyridone-3,4-dicarboxylic acid.

4. A process as defined in claim 3, wherein the hydrolyzing agent is an aqueous solution containing 3-10% by weight of one member selected from the group consisting of hydrochloric, sulfuric, nitric, phosphoric, acetic, oxalic, formic and tartaric acids.

5. A process as defined in claim 3, wherein the hydrolyzing agent is an aqueous solution containing 5-15% by weight of one member selected from the group consisting of the hydroxides, carbonates and bicarbonates of alkali metals and alkaline earth metals.

6. A process of preparing 5-hydroxy-6-methyl-2-pyridone-3,4-dicarboxylic acid, which comprises reacting 3-methyl-2-pyridone-3,4-dicarboxylic acid with at least one member selected from the group consisting of potassium persulfate, sodium persulfate and ammonium persulfate in an aqueous alkaline medium, then hydrolyzing the resulting reaction mixture with a mineral acid, and subsequently extracting it with an organic solvent selected from the group consisting of acetone, methanol, ethanol and the mixture thereof, thereby recovering 3-methyl-5-hydroxy-2-pyridone-3,4-dicarboxylic acid.

7. A process of preparing 3-methyl-5-hydroxy-2-pyridone-3,4-dicarboxylic acid, which comprises reacting 3-methyl-2-pyridone-3,4-dicarboxylic acid with at least one member selected from the group consisting of potassium persulfate, sodium persulfate and ammonium persulfate in an aqueous alkaline medium in the presence of a catalyst selected from the group consisting of ferrous sulfate, ferrous chloride, ferrous oxalate and manganese sulfate, then hydrolyzing the resulting reaction mixture with a mineral acid, and subsequently extracting the mixture with an organic solvent selected from the group consisting of acetone, methanol and ethanol and mixtures thereof, thereby recovering 3-methyl-5-hydroxy-2-pyridone-3,4-dicarboxylic acid.

8. A process of preparing 5-hydroxy-6-methyl-2-pyridone-3,4-dicarboxylic acid, which comprises hydrolyzing one member selected from the group consisting of the lower alkyl and aryl esters of 3-cyano-6-methyl-2-pyridone-4-carboxylic acid with an hydrolyzing agent, adjusting the resulting hydrolyzed mixture to a pH value of 8-14, treating the so adjusted mixture with at least one member selected from the group consisting of potassium persulfate, sodium persulfate and ammonium persulfate, hydrolyzing the resulting reaction mixture with a mineral acid, and subsequently extracting this reaction mixture with an organic solvent selected from the group consisting of acetone, methanol, ethanol and mixtures thereof, thereby recovering 5-hydroxy-6-methyl-2-pyridone-3,4-dicarboxylic acid.

9. A process of preparing 2-chloro-5-hydroxy-6-methylpyridine-3,4-dicarboxylic acid, which comprises reacting 5-hydroxy-6-methyl-2-pyridone-3,4-dicarboxylic acid with an anionic chlorine-liberating agent selected from the group consisting of phosphorus oxychloride, phosphorus pentachloride and the mixture of both and, then treating the resulting reaction mixture with an aqueous alkaline solution, and simultaneously extracting it with an organic solvent selected from the group consisting of ether, benzene, chloroform and mixtures thereof, thereby recovering 2-chloro-5-hydroxy-6-methylpyridine-3,4-dicarboxylic acid.

10. 5-hydroxy-6-methyl-2-pyridone - 3,4 - dicarboxylic acid.

References Cited in the file of this patent

UNITED STATES PATENTS

| | | |
|---|---|---|
| 2,417,541 | Carlson et al. | Mar. 18, 1947 |
| 2,752,353 | Song et al. | June 26, 1956 |

OTHER REFERENCES

Noller: "Chemistry of Organic Compounds," 2nd ed., pp. 252-4 (1956) (Saunders).